April 11, 1944.     E. E. HANS     2,346,576
COOLING OF CLOSED BODIES
Filed Oct. 3, 1941     2 Sheets-Sheet 1
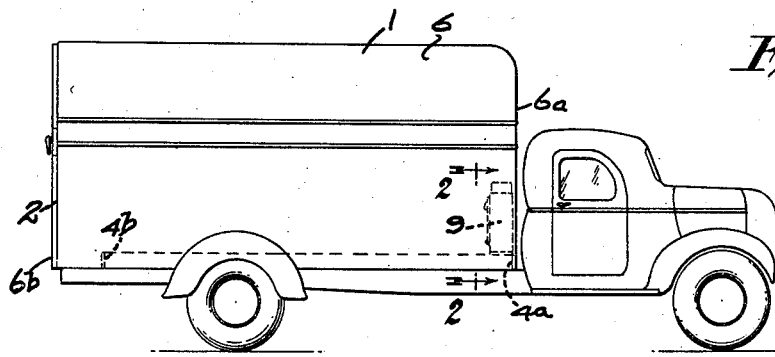
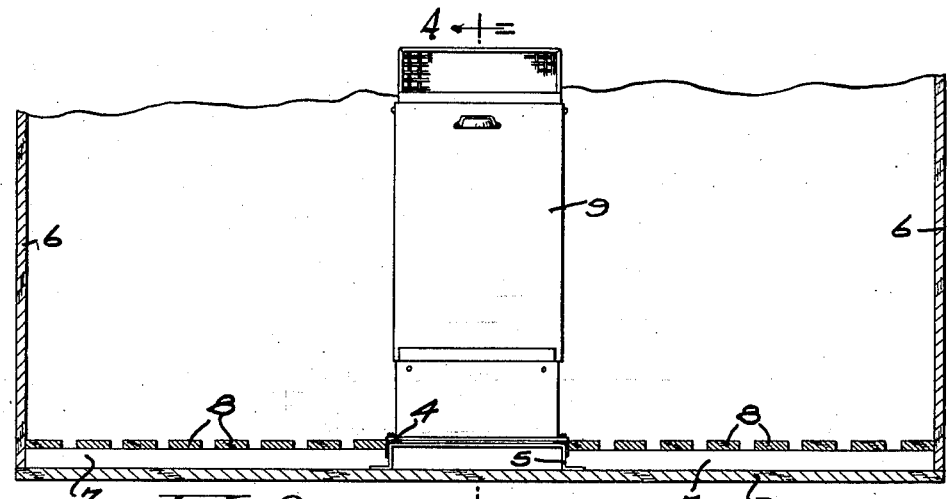
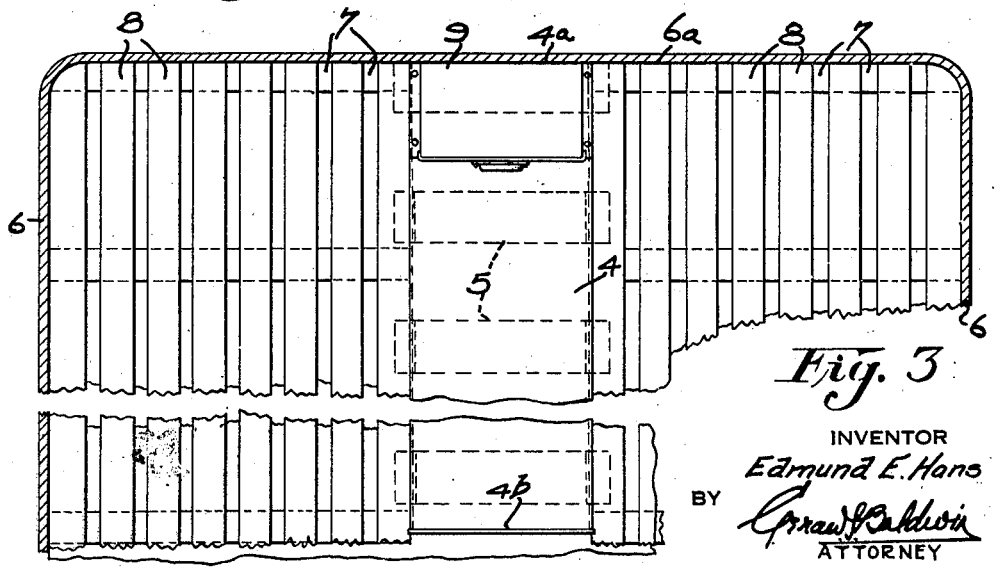
INVENTOR
Edmund E. Hans
BY
ATTORNEY April 11, 1944. E. E. HANS 2,346,576
COOLING OF CLOSED BODIES
Filed Oct. 3, 1941 2 Sheets-Sheet 2
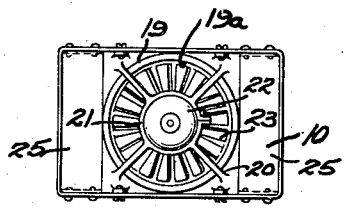
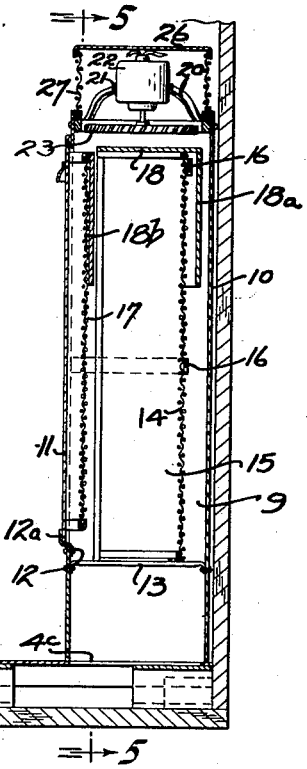
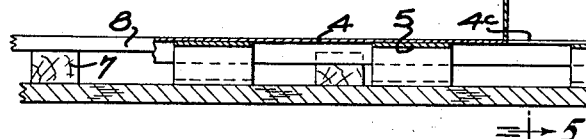
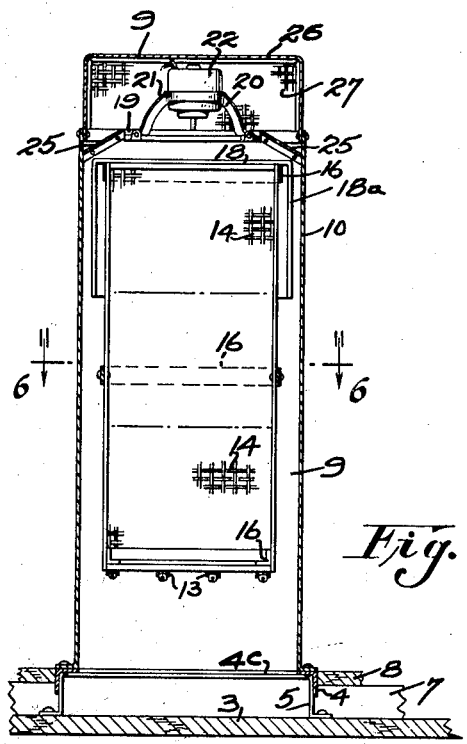
INVENTOR
Edmund E. Hans
BY
Gerald H. Baldwin
ATTORNEY Patented Apr. 11, 1944

2,346,576

UNITED STATES PATENT OFFICE 2,346,576

COOLING OF CLOSED BODIES

Edmund E. Hans, Detroit, Mich.

Application October 3, 1941, Serial No. 413,392

4 Claims. (Cl. 62—131)

This invention relates to improvements in cooling arrangements for the contents of closed bodies, particularly closed vehicle bodies. Food of various kinds, such as meats must be kept below a certain temperature and hitherto it has been customary to cool the entire space within which this food is packed in order to achieve the desired result.

It is an object of this invention to provide a cooling arrangement so constructed and arranged that substantially all the cooled air is circulated through and immediately adjacent the food packed in the interior of the body, so that the portion of the interior adjacent the food is maintained at a temperature materially lower than the remainder thereof. Thus I aim to provide a very economical arrangement wherein the space cooled is always substantially that occupied by the food therein, since, specially in the case of delivery trucks where the load diminishes as deliveries are made, the occupied space is frequently only a very small proportion of the entire space within the body.

Another object of the invention is to provide a cooling arrangement for the interior of a closed body including apertured flooring upon which food is packed around and adjacent a cooler unit, a duct from the underside of the unit through which cooled air is delivered into a space extending beneath substantially all of the apertured flooring, and a blower means and a refrigerant compartment within the unit. Air is discharged downwardly within the unit by the blower means and passes adjacent the refrigerant compartment, by which it is cooled, into the duct. Some of this cooled air then flows upwardly through the apertured flooring beneath the food and through the latter, and the remainder flows upwardly through flooring apertures immediately adjacent the packed food where its flow is in no wise obstructed by the latter. Thus some of the air within the body is circulated and re-circulated down through the cooler unit, through the duct and beneath the flooring, and upwardly through the flooring apertures beneath and immediately adjacent the food. The air is then drawn back over and through the food into the duct for re-cooling and re-circulation. Thus warmer air in the upper portion of the closed body interior remains substantially stagnant at a higher temperature, and the temperature of the cooled air flowing around the above described circuit is but little affected by the opening of a door in the body, particularly since it is customary to place the cooler unit at the end of the body interior remote from the said door.

Having thus briefly and broadly stated some of the objects and advantages of the invention, I will now describe a preferred embodiment of the invention with the aid of the accompanying drawings, in which:

Figure 1 illustrates a side view of a closed truck body equipped with my invention.

Figure 2 is an enlarged section on the line 2—2 of Figure 1.

Figure 3 is a partial plan view of Figure 2.

Figure 4 is a section on the line 4—4 of Figure 2.

Figure 5 shows a section on the line 5—5 of Figure 4.

Figure 6 is a section on the line 6—6 of Figure 5, and

Figure 7 is a plan view of the cooler unit with the cover removed.

Referring to the drawings, 1 designates the closed body of a vehicle access to the interior of which is had through a rear door 2. Extending longitudinally and substantially centrally along the floor 3 of the body within the latter is a U-shaped duct 4 the sides of which are downwardly directed and terminate a substantial distance above the floor 3. 5 denotes suitable brackets which extend at intervals across the inside of the duct 4 to support the latter at its required height and are secured to the floor 3 upon which the extremities rest. Extending transversely of the body 1 from opposite sides of the duct 4 to the adjacent side walls 6 of the body and lying upon the floor 3 are spaced supports 7. Extending longitudinally of the body 1 from front to rear and resting upon the supports 7 are spaced flooring members 8 the tops of which are in horizontal alignment with the top of the duct 4. Thus air discharged into the duct 4, in a manner hereinafter described, flows along the latter, outwardly between the supports 7, and upwardly between the spaced flooring members 8. The duct 4 is preferably closed at both ends as shown at 4a and 4b, and extends from the front wall 6a of the body substantially to the rear wall 6b in which the door 2 is provided.

Mounted adjacent the extremity of the duct 4 remote from the door 2 and upon the said duct is a cooler unit 9, consisting in part of a vertical housing 10 open on its underside to register with an opening 4c formed through the top of the duct 4. One of the vertical sides of the housing 10 is apertured intermediately of its width and height. This aperture is covered by a removable closure 11 which is preferably the full width of the apertured side and has its vertical margins rearwardly flexed to project over and lie adjacent opposite sides of the said housing. The lower extremity of the said closure is, in the present instance, supported by a forwardly stepped upwardly projecting flange 12a integral with a transverse member 12 secured horizontally across the housing. Extending across the housing interior and supported thereby are a plurality of horizontal bars 13 which are preferably located somewhat below the bottom of the closure 11. Projecting upwardly from the bars 13 and terminating a short distance beneath the top of the housing are perforated walls 14 which form three sides of a refrigerant compartment 15. These walls, which are usually made of wire mesh, are each spaced from and adjacent one of the unapertured sides of the housing 10, and are supported as by straps 16. A fourth perforate wall 17 is supported by and spaced inwardly from the closure 11 so that the walls 14 and 17 together form the enclosing sides of the compartment 15 which is bounded at the bottom by the bars 13 and closed at the top by an imperforate cap 18 having downturned sides 18a which depend for an appreciable distance between the perforate walls 14 and the adjacent housing sides. Supported by the closure 11 and, in the present instance, positioned inside the perforate wall 17, is a plate 18b to form a fourth depending side for the cap 18. Thus the sides 18a of the cap 18 and the plate 18b prevent air which is flowing downward within the housing 10 entering the top of the refrigerant compartment 15, so that such air can only enter the said compartment beneath the sides 18a and plate 18b.

Extending across the upper portion of the housing 10 above the cap 18 is a member 19 centrally apertured at 19a and secured to opposite sides of the said housing. This member 19 has integral arms 20 which project upwardly and terminate in a split ring 21 concentric with the aperture 19a. Supported in the split ring 21 is a vertical motor 22 having a downwardly extending shaft upon which a fan 23 is secured. This fan is mounted for rotation at least partly within the aperture 19a and concentric therewith. The member 19 while extending completely across the housing 10 preferably terminates some distance from the ends thereof, and 25 denotes downwardly and outwardly inclined imperforate baffles which prevent downward passage of air into the housing at these ends, so that all downwardly flowing air entering the housing must pass through the member aperture 19a.

Extending across the entire top of the housing and spaced above the top of the motor 22 is a cover 26 which is provided with an imperforate top and has at least some of its sides perforate as shown at 27 through which air may flow between the arms 20 to the fan 23 for downward discharge between the housing sides and the perforate walls 14 and 17. Moreover beneath the cap sides 18a and the plate 18b this downwardly discharged air may enter the refrigerant compartment 15 and come into direct contact with ice, or dry ice or other refrigerating agent, therein.

From the foregoing it will be clearly seen that air is drawn into the housing 10 through the aperture 19 by the fan 23 and is discharged downwardly through the housing in intimate contact with a refrigerant in the lower portion of the compartment 15. The discharged air then passes into the duct 4 whence it flows between the supports 7 and upwardly between the spaced flooring 8. The food or other material to be kept cool is packed upon the flooring immediately adjacent the cooler unit 9 and outwardly therefrom. Some of the air discharged from the unit rises through the packed food or other material and the rest of this air rises immediately adjacent thereto where its passage upwardly from between the spaced flooring is not impeded by the said food or other material. This air rises to substantially the height of the apertured sides 27 of the cover 26 as it is drawn back to and through the latter by the fan 23 for re-cooling and re-circulation. In this way a predetermined proportion of the air within the body interior is continuously circulated in substantially arcuate paths beginning at the space 7 and terminating with the suction outlet to fan 23 while the remaining air therein is more or less stagnant and usually remains at a higher temperature. Thus according to my system a minimum volume of air need be handled and treated by the unit 9. This is of particular importance in the case of delivery trucks because as deliveries are made and the load decreases only a small pile of material immediately adjacent the unit 9 can be kept at the desired temperature by the circulation of only a very small volume of cooled air. While only a part of the cooled air will rise through the packed load due to its flow being impeded by the said load, the rest of the air rises through the flooring immediately adjacent the load where its flow is unhindered. So that under all conditions air discharged from the unit rises, irrespective of the size of the load, through and immediately adjacent the latter and does not circulate to any marked degree throughout the rest of the body interior.

The purpose of the cap 18 and its sides 18a and the plate 18b is to prevent air discharged by the fan coming into direct contact with the refrigerant in the compartment 15 throughout the entire height of the latter. If this were to occur when the compartment was completely full of refrigerant the air would be cooled too quickly and the refrigerant would melt too fast. Whereas with the arrangement shown the air passing downwardly in the housing 10 comes into direct contact with the refrigerant for the same distance, that is between the bottom of the cap sides 18a and the bars 13, so long as sufficient refrigerant remains to occupy the whole of that lower part of the compartment 15, and throughout all that time substantially uniform cooling is imparted to the air being discharged into the duct 4.

The spacing of the downturned edges of the duct 4 above the floor 3 controls the amount of air which flows laterally beneath each portion of the flooring 8, so that by choosing the correct spacing the lateral air flow from beneath the duct may be regulated to suit the specific conditions under which the device is to function.

In Figure 1 while the unit 9 is shown extending upwardly for less than one-half the total height of the body in which it is located, it is understood that in cases when the body is to be loaded for the greater portion of its height a correspondingly higher unit is provided.

While in the foregoing description reference has been made to the use of ice or dry ice in the refrigerant compartment 15, it is of course understood that a mechanical refrigerating unit may be substituted therefor if desired. It is moreover understood that other alterations and modifications may be made in the embodiment herein shown and described provided the said alterations and modifications fall within the scope of the appended claims.

What I claim is:

1. An arrangement of the character described comprising a closed body including a floor, horizontally aligned flooring members spaced above the floor and from one another, a duct extending across the floor the top of which is substantially in alignment with the flooring members, a cooler unit on the duct adjacent and around which packages are adapted to be piled on the flooring, the bottom of the cooler unit and the top of the duct having registering openings formed therethrough, a fan in said unit adapted to draw air from above and around said packages into the unit and to discharge it through the duct and under the flooring whence it rises between and around said packages, and a refrigerant compartment in said unit adjacent which the air passes.

2. An arrangement of the character described comprising the combination set forth in claim 1, including means for protecting a refrigerant in the upper portion of the compartment from being directly contacted by air during downward passage of the latter through the cooler unit.

3. An arrangement of the character described comprising a duct in the form of an inverted U, means supporting said duct with its sides spaced above the floor of a closed body, supports on the floor angularly disposed to said duct, spaced flooring members on said supports, a cooler unit on said duct having its lower extremity open to register with an aperture formed through the top of the duct, a fan in said cooler for discharging air downwardly in the cooler unit into the duct whence it flows upwardly between and around packages on said flooring members adjacent and around said unit and is drawn back into the top of the unit by said fan, and a refrigerant compartment in said unit adjacent which the discharged air passes whereby air circulated and re-circulated around the above described path is maintained at a cooler temperature by a refrigerant in said compartment than the remainder of the air in said closed body.

4. An arrangement of the character described comprising the combination set forth in claim 3, including means for protecting a refrigerant in the upper portion of the compartment from being directly contacted by the air during its downward passage through the cooler unit.

EDMUND E. HANS.